United States Patent
Yang et al.

(10) Patent No.: US 12,525,876 B2
(45) Date of Patent: Jan. 13, 2026

(54) EMI SUPPRESSION METHOD

(71) Applicant: Delta Electronics, Inc., Taoyuan (TW)

(72) Inventors: Shang-Kay Yang, Taoyuan (TW); Hsien-Kai Wang, Taoyuan (TW); Yen-Wei Lin, Taoyuan (TW); Hsing-Yi Chung, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 279 days.

(21) Appl. No.: 18/523,802

(22) Filed: Nov. 29, 2023

(65) Prior Publication Data

US 2025/0070653 A1 Feb. 27, 2025

(30) Foreign Application Priority Data

Aug. 23, 2023 (CN) .......................... 202311066342.9

(51) Int. Cl.
*H02M 1/44* (2007.01)
*H02M 3/04* (2006.01)

(52) U.S. Cl.
CPC ............... *H02M 1/44* (2013.01); *H02M 3/04* (2013.01)

(58) Field of Classification Search
CPC .................................. H02M 1/44; H02M 3/04
USPC ........................................................ 323/234
See application file for complete search history.

(56) References Cited

U.S. PATENT DOCUMENTS

| 9,531,271 B2 * | 12/2016 | Shi ..................... H02M 3/1584 |
| 2012/0014148 A1 * | 1/2012 | Li ..................... H02M 1/4216 363/78 |
| 2013/0329466 A1 * | 12/2013 | Telefus ............... H02M 1/4258 363/21.12 |
| 2021/0313875 A1 * | 10/2021 | Messina .............. H02M 1/4208 |
| 2022/0302838 A1 * | 9/2022 | Eleftheriadis ......... H02M 3/156 |

FOREIGN PATENT DOCUMENTS

| CN | 101325367 A | 12/2008 |
| CN | 104104231 A | 10/2014 |
| CN | 104377951 A | 2/2015 |
| CN | 105226953 A | 1/2016 |
| CN | 105978317 A | 9/2016 |
| CN | 113162426 A | 7/2021 |
| CN | 113765363 A | 12/2021 |
| TW | I683523 B | 1/2020 |

\* cited by examiner

Primary Examiner — Yemane Mehari
(74) Attorney, Agent, or Firm — KIRTON McCONKIE; Evan R. Witt

(57) ABSTRACT

An electromagnetic interference suppression method for at least one power supply is provided. Each of the at least one power supply includes a first conversion circuit and a second conversion circuit. The first conversion circuit receives an input voltage and outputs a first output voltage. The second conversion circuit receives the first output voltage and outputs a load current. If the input voltage received by the first conversion circuit of the at least one power supply is a DC voltage, an electromagnetic interference suppression operation is performed. Then, the electromagnetic interference suppression operation is performed to determine whether the load current is greater than a preset current and lower than an upper current limit. If the determining condition is satisfied, the first output voltage is dynamically adjusted, and a peak-peak value of the first output voltage is not zero with the varying load current.

19 Claims, 7 Drawing Sheets

EMI SUPPRESSION METHOD

CROSS-REFERENCE TO RELATED APPLICATION

This application claims priority to Chinese Patent Application No. 202311066342.9, filed on Aug. 23, 2023, the entire content of which is incorporated herein by reference for all purposes.

FIELD OF THE INVENTION

The present disclosure relates to an electromagnetic interference (EMI) suppression method, and more particularly to an electromagnetic interference suppression method for a power supply.

BACKGROUND OF THE INVENTION

With the rapid development of the information industry, the power supply has played an indispensable role. The input voltage received by the power supply is an AC voltage or a DC voltage. Generally, a power supply comprises two stages, including a first conversion circuit and a second conversion circuit. For example, the second conversion circuit is a resonant conversion circuit.

In case that the first conversion circuit receives the AC voltage, the frequency of the output voltage from the first conversion circuit is twice the frequency of the voltage from the utility power source. For regulating the output voltage from the first conversion circuit, the switching frequency of the second conversion circuit (i.e., the resonant conversion circuit) is changed in the range of ±6 kHz at the rated power. This frequency change is similar to the characteristic of frequency jitter. Due to the characteristics, the frequency of electromagnetic interference generated by the second conversion circuit is evenly distributed in the range of ±6 kHz (<150 kHz), and the double frequency is distributed in the range of ±12 kHz (>150 kHz). Consequently, the electromagnetic interference suppression efficacy is enhanced.

In case that the first conversion circuit receives the DC voltage, the frequency of the output voltage from the first conversion circuit does not contain the double frequency of the voltage from the utility power source. Consequently, the switching frequency of the second conversion circuit is slightly changed in the range of ±0.2 kHz. Since the frequency change amount is very small, the frequency of the electromagnetic interference generated by the second conversion circuit will be concentrated at N times the current switching frequency, wherein N is a positive integer. Consequently, there is not the characteristic of frequency jitter. In case that the first conversion circuit receives the DC voltage, the electromagnetic interference suppression efficacy of the power supply is not satisfied.

Therefore, there is a need of providing an improved electromagnetic interference suppression method in order to overcome the drawbacks of the conventional technologies.

SUMMARY OF THE INVENTION

The present disclosure provides an electromagnetic interference suppression method for a power supply. In case that the power supply receives a DC input voltage, the electromagnetic interference suppression efficacy can be enhanced when compared with the conventional technologies.

In accordance with an aspect of present disclosure, an electromagnetic interference suppression method for at least one power supply is provided. Each of the at least one power supply includes a first conversion circuit and a second conversion circuit. The first conversion circuit receives an input voltage and outputs a first output voltage and an output current. The second conversion circuit is controlled in a frequency modulation manner. The second conversion circuit receives the first output voltage and the output current and outputs a load current and a second output voltage. The electromagnetic interference suppression method includes the following steps. When the input voltage received by the first conversion circuit of the at least one power supply is a DC voltage, the at least one power supply performs an electromagnetic interference suppression operation. Then, the electromagnetic interference suppression operation is performed to determine whether the load current is greater than a preset current and lower than an upper current limit. When the load current is lower than the preset current or greater than the upper current limit, the first output voltage is adjusted to a constant voltage. When the load current is greater than the preset current and lower than the upper current limit, the first output voltage is dynamically adjusted, and a peak-peak value of the first output voltage is not zero with the varying load current.

In accordance with another aspect of present disclosure, an electromagnetic interference suppression method for at least one power supply is provided. Each of the at least one power supply includes a first conversion circuit and a second conversion circuit. The first conversion circuit receives an input voltage and outputs a first output voltage and an output current. The second conversion circuit is controlled in a frequency modulation manner. The second conversion circuit receives the first output voltage and the output current and outputs a load current and a second output voltage. The electromagnetic interference suppression method includes the following steps. When the input voltage received by the first conversion circuit of the at least one power supply is a DC voltage, the at least one power supply performs an electromagnetic interference suppression operation. Then, the electromagnetic interference suppression operation is performed to determine whether the load current is greater than a preset current and lower than an upper current limit. When the load current is greater than the preset current and lower than the upper current limit, the first output voltage is dynamically adjusted, and a peak-peak value of the first output voltage is not zero with the varying load current.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
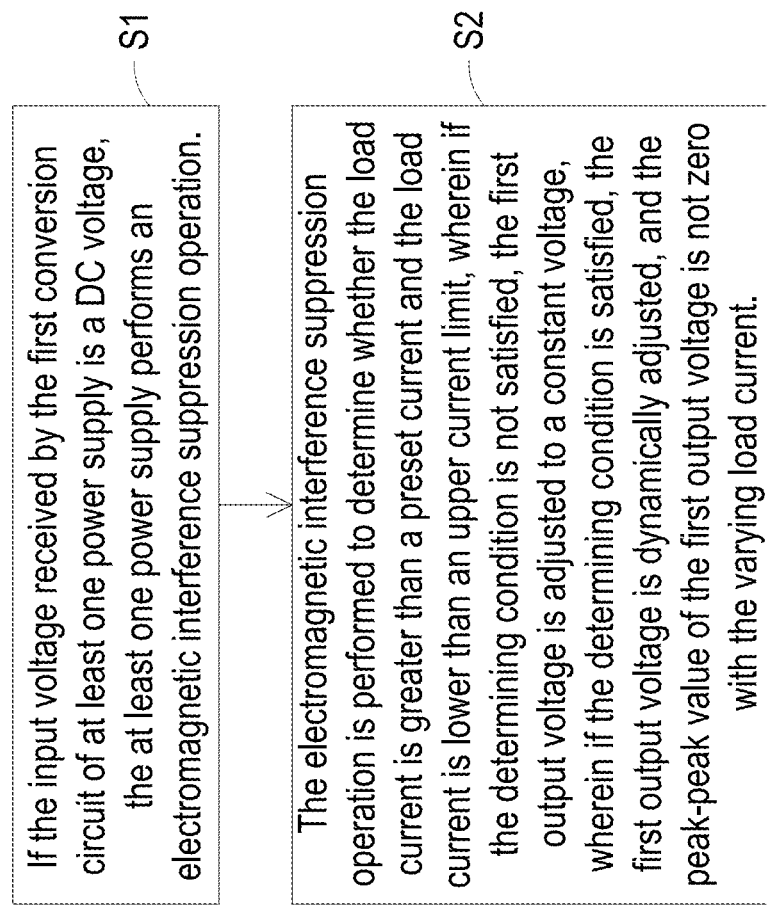
FIG. 1 is a flowchart of an electromagnetic interference suppression method according to an embodiment of the present disclosure.
Figure 2:
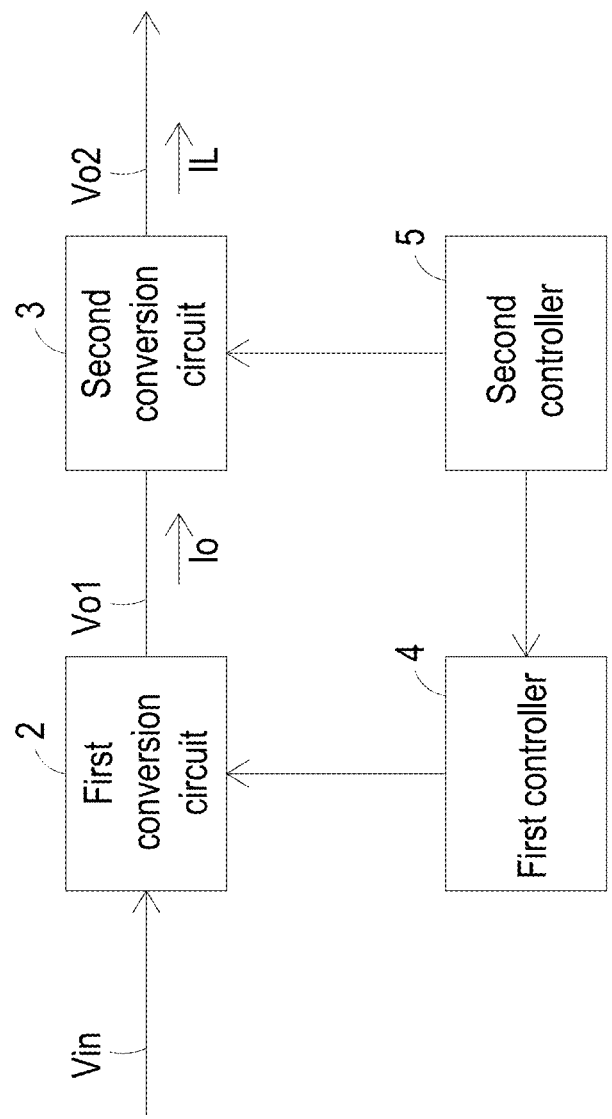
FIG. 2 is a schematic circuit block diagram illustrating a power supply using the electromagnetic interference suppression method of FIG. 1.
Figure 3:
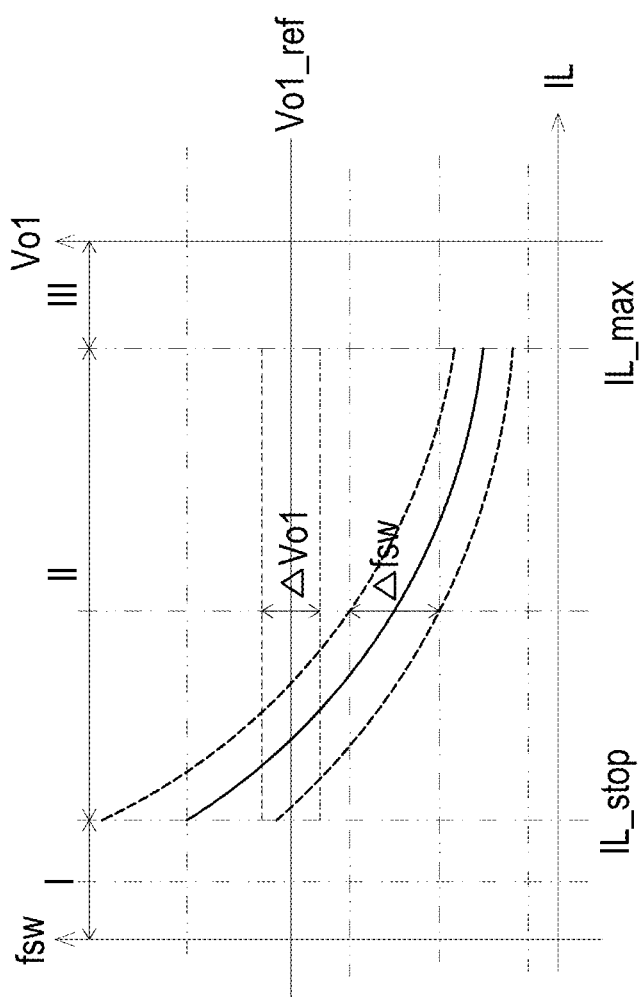
FIG. 3 is a characteristic curve of the power supply using the electromagnetic interference suppression method of the present disclosure, in which the first output voltage is changed, and the peak-peak value of the first output voltage is not changed with the varying load current.
Figure 4:
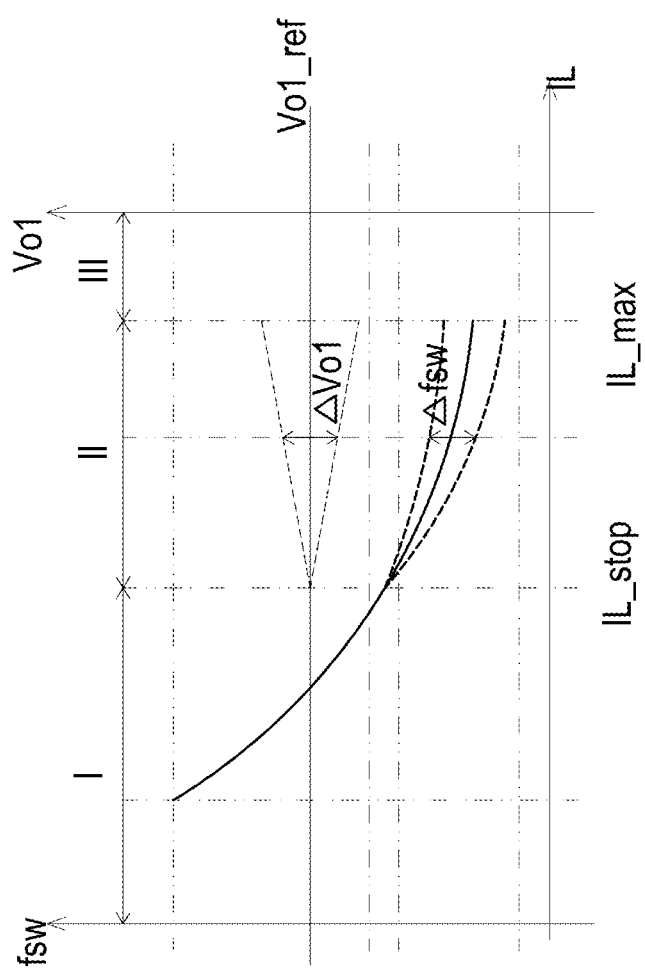
FIG. 4 is a characteristic curve of the power supply using the electromagnetic interference suppression method of the present disclosure, in which the first output voltage is changed, and the peak-peak value of the first output voltage is changed with the varying load current.

FIG. 1 is a flowchart of an electromagnetic interference suppression method according to an embodiment of the present disclosure. FIG. 2 is a schematic circuit block diagram illustrating a power supply using the electromagnetic interference suppression method of FIG. 1. FIG. 3 is a characteristic curve of the power supply using the electromagnetic interference suppression method of the present disclosure, in which the first output voltage is changed, and the peak-peak value of the first output voltage is not changed with the varying load current. FIG. 4 is a characteristic curve of the power supply using the electromagnetic interference suppression method of the present disclosure, in which the first output voltage is changed, and the peak-peak value of the first output voltage is changed with the varying load current.

The electromagnetic interference suppression method of the present disclosure can be applied to the power supply 1 as shown in FIG. 2. The power supply 1 includes a first conversion circuit 2 and a second conversion circuit 3. The first conversion circuit 2 receives an input voltage Vin, and the first conversion circuit 2 outputs a first output voltage Vo1 and an output current Io. The second conversion circuit 3 is controlled in a frequency modulation manner. In addition, the second conversion circuit 3 receives the first output voltage Vo1 and the output current Io, and the second conversion circuit 3 outputs a load current IL and a second output voltage Vo2. In other words, the first output voltage Vo1 from the first conversion circuit 2 is served as the input voltage of the second conversion circuit 3, and the output current Io from the first conversion circuit 2 is served as the input current of the second conversion circuit 3.

Figure 5:
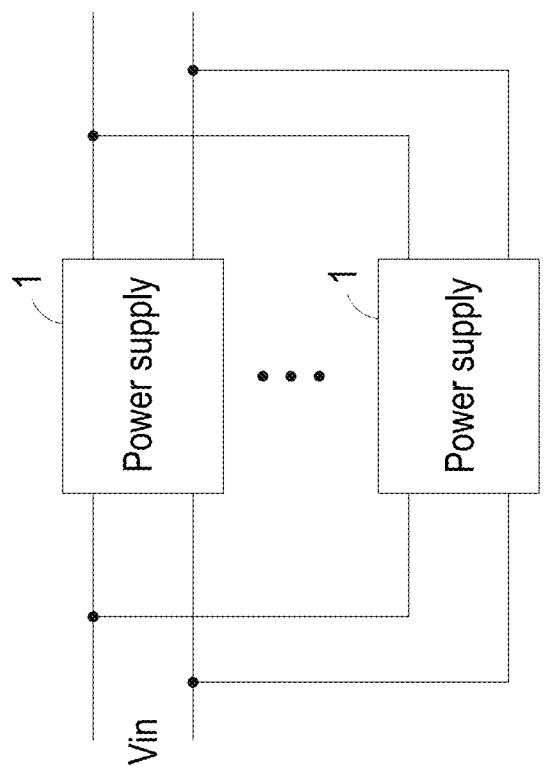
FIG. 5 schematically illustrates the architecture of a power system with a plurality of power supplies.

FIG. 5 schematically illustrates the architecture of a power system with a plurality of power supplies. The electromagnetic interference suppression method of the present disclosure is also applied to a power system with a plurality of power supplies 1. The plurality of power supplies 1 are connected with each other in parallel. The circuitry topology of each of the plurality of power supplies is similar to the circuitry topology as shown in FIG. 2, and not redundantly described herein.

The input terminals of the plurality of power supplies 1 are electrically connected with each other. That is, the input terminals of the plurality of first conversion circuits 2 of the plurality of power supplies are connected with each other.

Moreover, the output terminals of the plurality of power supplies 1 are electrically connected with each other. That is, the output terminals of the plurality of second conversion circuits 3 of the plurality of power supplies 1 are connected with each other.

Preferably but not exclusively, the first conversion circuit 2 is a boost conversion circuit or a buck conversion circuit, and the second conversion circuit 3 is a resonant conversion circuit (e.g., an LLC resonant conversion circuit or an LCL resonant conversion circuit). Moreover, as shown in FIG. 2, the power supply 1 further includes a first controller 4 and a second controller 5. The first conversion circuit 2 is controlled by the first controller 4. The second conversion circuit 3 is controlled by the second controller 5. In addition, the first controller 4 and the second controller 5 are in communication with each other.

The electromagnetic interference suppression method includes the following steps.

In a step S1, if the input voltage Vin received by the first conversion circuit 2 of at least one power supply 1 is a DC voltage, the at least one power supply 1 performs an electromagnetic interference suppression operation. As mentioned above, the second conversion circuit 3 of the power supply 1 has good electromagnetic interference suppression efficacy when the input voltage Vin is the AC voltage. Consequently, the electromagnetic interference suppression operation is performed only when the input voltage Vin is the DC voltage.

In a step S2, the electromagnetic interference suppression operation is performed to determine whether the load current IL is greater than a preset current IL_stop and lower than an upper current limit IL_max. If the determining result indicates that the load current IL is lower than the preset current IL_stop or greater than the upper current limit IL_max (i.e., the determining condition is not satisfied), the first output voltage Vo1 is adjusted to a constant voltage. That is, the peak-peak value $\Delta$Vo1 of the first output voltage Vo1 is zero (i.e., the first output voltage Vo1 is equal to a voltage reference value Vo1_ref). If the load current IL is greater than the preset current IL_stop and lower than the upper current limit IL_max (i.e., the determining condition is satisfied), the first output voltage Vo1 is dynamically adjusted, and the peak-peak value of the first output voltage Vo1 is not zero with the varying load current IL.

Of course, the step S2 may be altered according to the practical requirements. In another embodiment, if the load current IL is greater than the preset current IL_stop and lower than the upper current limit IL_max (i.e., the determining condition is satisfied), the peak-peak value $\Delta$Vo1 of the first output voltage Vo1 is adjusted to a constant value with the varying load current IL. Alternatively, if the determining condition is satisfied, the peak-peak value $\Delta$Vo1 of the first output voltage Vo1 is linearly changed with the varying load current IL.

In this context, the zero value of the peak-peak value $\Delta$Vo1 of the first output voltage Vo1 indicates that the peak-peak value $\Delta$Vo1 is zero in the ideal condition. However, since the first conversion circuit 2 is a switching conversion circuit, the first output voltage Vo1 may contain tiny ripple even if it is adjusted to the constant voltage. The tiny ripple will be ignored.

The principles of the electromagnetic interference suppression method and the operations of the step S2 will be described in more details as follows.

If the input voltage Vin is the DC voltage, the first output voltage Vo1 from the first conversion circuit 2 is controlled to be changed. Consequently, the input voltage received by the second conversion circuit 3 is correspondingly adjusted. If the load current IL is increased, the first output voltage Vo1 is controlled to be increased. If the load current IL is decreased, the first output voltage Vo1 is controlled to be decreased. Moreover, the output terminal of the first conversion circuit 2 is connected with the input terminal of the second conversion circuit 3. Moreover, the second conversion circuit 3 is controlled in the frequency modulation manner, and the input voltage received by the second conversion circuit 3 (i.e., the first output voltage Vo1) is influenced by the change of the input voltage. In order to adjust the second output voltage Vo2 to a constant value, the switching frequency fsw of the second conversion circuit 3 is correspondingly adjusted. If the variation amount of the first output voltage Vo1 is larger, the change of the switching frequency fsw is also larger. Whereas, if the variation amount of the first output voltage Vo1 is smaller, the switching frequency fsw is smaller.

In accordance with the electromagnetic interference characteristics of any conversion circuit (including the resonant conversion circuit), the following conditions can be observed. That is, if the loading is increased, the N-order harmonic energy generated by the conversion circuit is increased. Whereas, if the loading is decreased, the N-order harmonic energy generated by the conversion circuit is decreased.

Due to these physical characteristics, the electromagnetic interference specification about the limitation of the harmonic energy will be deduced. If the loading is increased, the generated harmonic energy is increased and close to the upper limit value. Whereas, if the loading is decreased, the generated harmonic energy is decreased and far away from the upper limit value. Due to the electromagnetic interference between the first output voltage Vo1 of the first conversion circuit 2 and the second conversion circuit 3, the first output voltage Vo1 outputted from the first conversion circuit 2 is adjusted according to the different loading conditions. If the loading is increased, the generated harmonic energy is increased. In order to comply with the specifications, the variation amount of the first output voltage Vo1 from the first conversion circuit 2 needs to be increased. Whereas, if the loading is decreased, the generated harmonic energy is decreased. Consequently, the variation amount of the first output voltage Vo1 from the first conversion circuit 2 is decreased or kept unchanged.

In an embodiment of the step S2, the first output voltage Vo1 is dynamically changed, and the peak-peak value ΔVo1 of the first output voltage Vo1 is maintained at the constant value with the varying load current IL. As shown in FIG. 3, the power supply 1 can be operated in three operating zones. These operating zones include a first operating zone, a second operating zone and a third operating zone. In the first operating zone, the load current IL is lower than the preset current IL_stop. For example, the preset current IL_stop is equal to the minimum value of the load current IL when the harmonic energy generated by the power supply is within the limitation of the regulations. In the first operating zone, the first output voltage Vo1 from the first conversion circuit 2 is adjusted to the constant voltage. Moreover, in the second operating zone, the load current IL is greater than the preset current IL_stop and lower than the upper current limit IL_max. Moreover, in the second operating zone, the first output voltage Vo1 form the first conversion circuit 2 is dynamically changed, and the peak-peak value ΔVo1 of the first output voltage Vo1 is constant with the varying load current IL. Moreover, since the corresponding peak-peak value ΔVo1 is constant with the varying load current IL, the variation amount Δfsw of the switching frequency fsw of the second conversion circuit 3 is constant with the varying load current IL. In the third operating zone, the load current IL is greater than the upper current limit IL_max. Preferably but not exclusively, the upper current limit IL_max is the maximum rated output current of the power supply 1. Moreover, in the third operating zone, the first output voltage Vo1 form the first conversion circuit 2 is adjusted to the constant voltage.

In another embodiment of the step S2, the first output voltage Vo1 is dynamically changed, and the peak-peak value ΔVo1 of the first output voltage Vo1 is changed linearly with the varying load current IL. As shown in FIG. 4, the power supply 1 includes three operating zones. These operating zones include a first operating zone, a second operating zone and a third operating zone. The operating conditions and the control methods of the power supply 1 in the first operating zone and the third operating zone as shown in FIG. 4 are similar to those as shown in FIG. 3, and not redundantly described herein. Please refer to FIG. 4. In the second operating zone, the load current IL is greater than the preset current IL_stop and lower than the upper current limit IL_max. Moreover, in the second operating zone, the first output voltage Vo1 from the first conversion circuit 2 is dynamically changed, and the peak-peak value ΔVo1 of the first output voltage Vo1 is changed linearly with the varying load current IL. Since the peak-peak value ΔVo1 of the first output voltage Vo1 is changed linearly with the varying load current IL, the variation amount Δfsw of the switching frequency fsw of the second conversion circuit 3 is changed linearly with the varying load current IL. In an embodiment, the peak-peak value ΔVo1 of the first output voltage Vo1 is equal to the difference between the load current IL and the preset current IL_stop multiplied by a fixed value K, i.e., $\Delta Vo1 = (IL - IL\_stop) \times K$.

From the above descriptions, the present disclosure provides the electromagnetic interference suppression method. In case that the input voltage Vin received by the first conversion circuit 2 of the power supply 1 is the DC voltage, the power supply 1 performs the electromagnetic interference suppression operation. If the load current IL is greater than the preset current IL_stop and lower than the upper current limit IL_max, the first output voltage Vo1 is dynamically changed, and the peak-peak value ΔVo1 of the first output voltage Vo1 is not zero with the varying load current IL. For example, the peak-peak value ΔVo1 of the first output voltage Vo1 is kept unchanged with the varying load current IL. Alternatively, the peak-peak value ΔVo1 of the first output voltage Vo1 is changed linearly with the varying load current IL. Under this circumstance, the electromagnetic interference suppression efficacy can be enhanced. Whereas, if the load current IL is lower than the preset current IL_stop or greater than the upper current limit IL_max, the electromagnetic interference suppression is not required. Consequently, the first output voltage Vo1 is kept unchanged. In this way, the electromagnetic interference suppression efficacy of the power supply 1 can be enhanced.

In an embodiment, the second controller 5 detects the magnitude of the load current IL, and the detecting result is provided to the first controller 4. Moreover, the first output voltage Vo1 from the first conversion circuit 2 is controlled by the first controller 4 according to a voltage reference value Vo1_ref in the detecting result. For example, the voltage reference value Vo1_ref is shown in FIG. 3 or FIG. 4.

Figure 6:
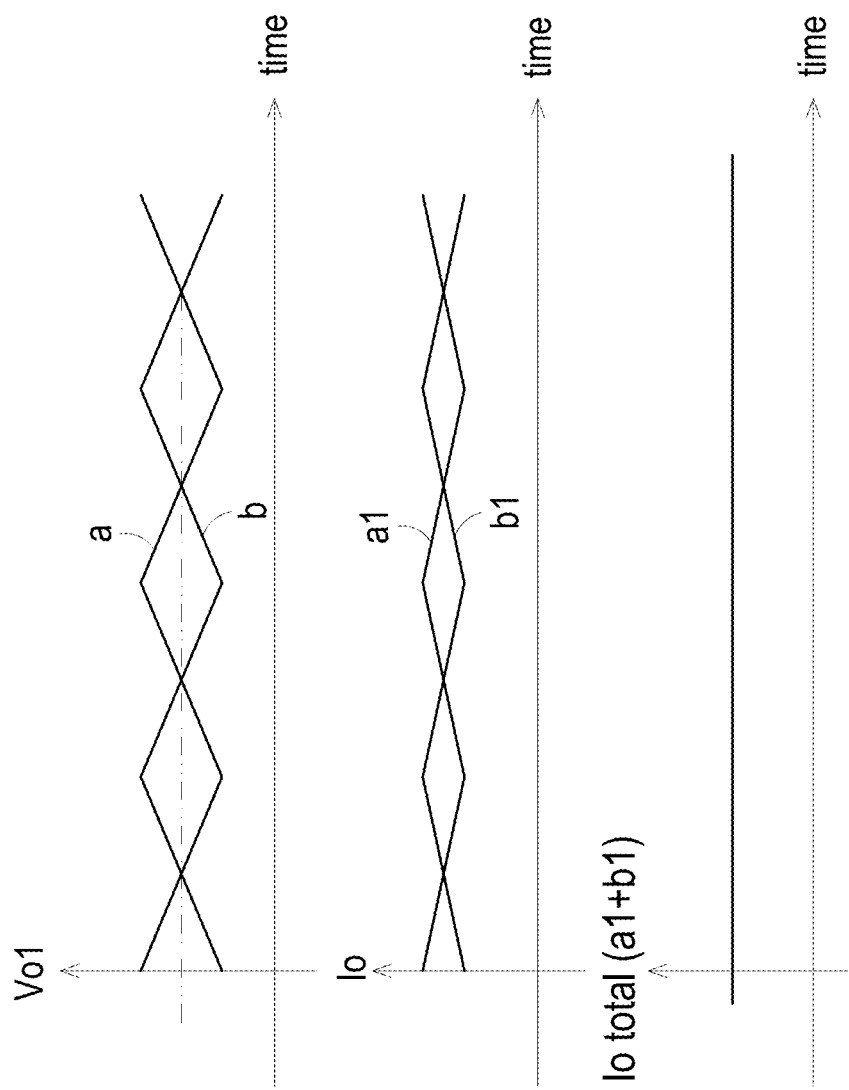
FIG. 6 is a schematic timing waveform diagram illustrating first output voltage, the output current and the current total of the power supply, in which there is a phase difference between the two first output voltages from two first conversion circuits of two power suppliers.

FIG. 6 is a schematic timing waveform diagram illustrating first output voltage, the output current and the current total of the power supply, in which there is a phase difference between the two first output voltages from two first conversion circuits of two power suppliers. In an embodiment, the electromagnetic interference suppression method is applied to the plurality of power supplies 1 of the power system as shown in FIG. 5. The plurality of power supplies 1 are in communication with each other through an external controller (not shown) or the internal controllers of the plurality of power supplies 1. Consequently, there is a phase difference between the variation amounts of the first output voltages Vo1 from the first conversion circuits 2 of every two power supplies 1. Correspondingly, there is the phase difference between the current ripples in the output currents Io from the first conversion circuits 2 of the plurality of power supplies 1. Consequently, the current ripples cancel out each other. Due to this design, the ripple in the superimposed output currents from the plurality of parallel-connected power suppliers 1 will not be too large.

In an embodiment, the power system includes N power supplies. Moreover, the phase difference between the first output voltages Vo1 from the first conversion circuits 2 of every two adjacent power supplies 1 is 360°/N.

Please refer to FIG. 6. In case that the electromagnetic interference suppression method is applied to a power system comprising two power supplies 1, the phase difference between the first output voltage Vo1 of one power supply 1 (e.g., the curve a) and the first output voltage Vo1 from the other power supply 1 (e.g., the curve b) is 360°/2=180°. Correspondingly, the phase difference between the output current Io from one power supply 1 (e.g., the curve a1) and the output current Io from the other power supply 1 (e.g., the curve b1) is also 180°. Under this circumstance, the current ripples in the two output currents will cancel out each other. That is, as shown in FIG. 6, there is almost no current ripple in Io total (i.e., a1+b1).

Figure 7:
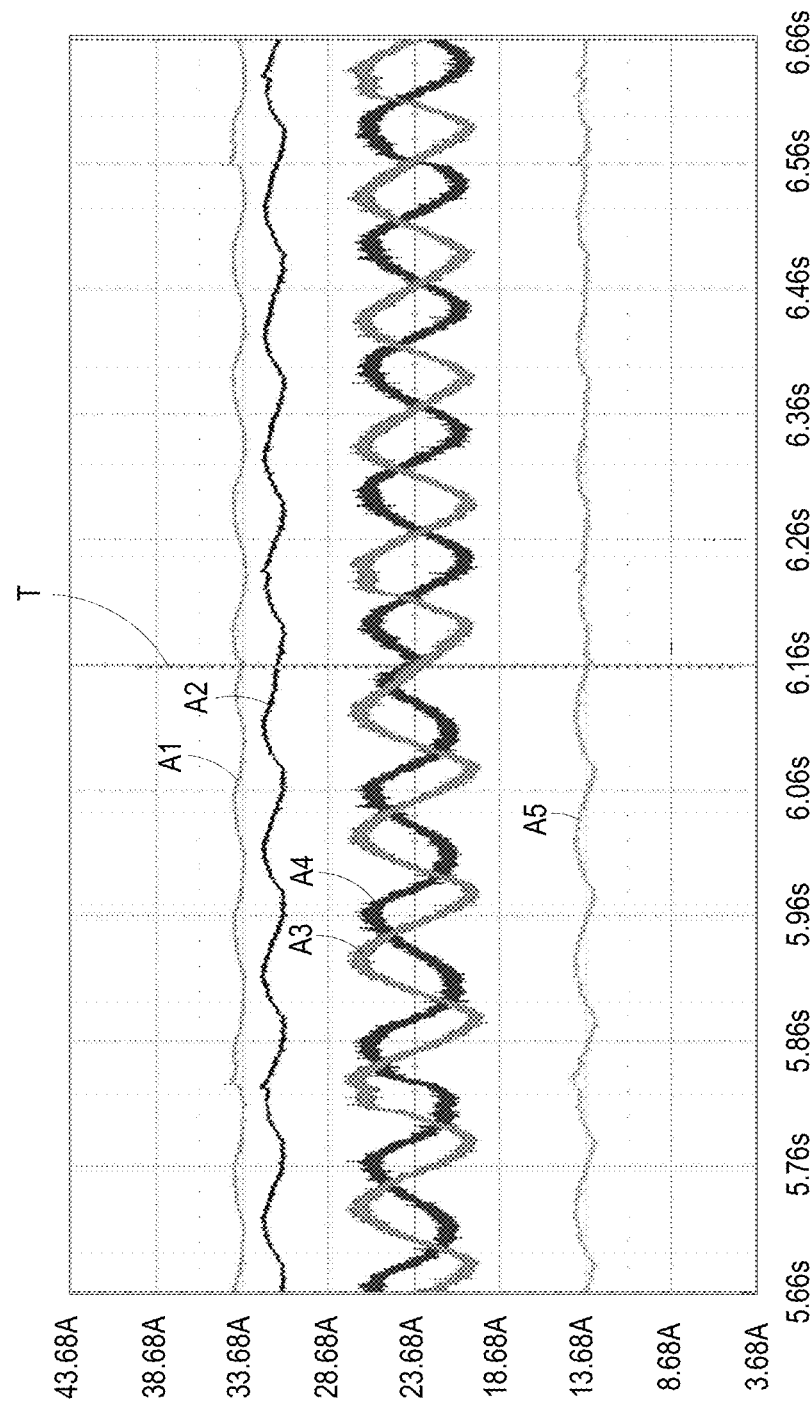
FIG. 7 is a schematic timing waveform diagram illustrating associated voltages and currents from the first conversion circuits of a power system with two power supplies.

FIG. 7 is a schematic timing waveform diagram illustrating associated voltages and currents from the first conversion circuits of a power system with two power supplies. For example, the power system includes a first power supply 1 and a second power supply 1. The first power supply 1 and the second power supply 1 are connected with each other in parallel.

The curve A1 denotes the waveform of the output current Io from the first conversion circuit 2 of the first power supply 1. The curve A2 denotes the waveform of the output current Io from the first conversion circuit 2 of the second power supply 1. The curve A3 denotes the waveform of the first output voltage Vo1 from the first conversion circuit 2 of the first power supply 1. The curve A4 denotes the waveform of the first output voltage Vo1 from the first conversion circuit 2 of the second power supply 1. The curve A5 denotes the combined waveform of the curve A1 and the curve A2. After the time point T, the phase difference between the first output voltages Vo1 from the first conversion circuits 2 of the two power supplies 1 is 180°. Consequently, the current ripples in the output currents Io from the first conversion circuits 2 of the plurality of power supplies 1 cancel out each other.

In some other embodiments, the step S2 of the electromagnetic interference suppression method is modified. The electromagnetic interference suppression operation is performed to determine whether the load current IL is greater than the preset current IL_stop and lower than an upper current limit IL_max. If the load current IL is greater than the preset current IL_stop and lower than the upper current limit IL_max (i.e., the determining condition is satisfied), the first output voltage Vo1 is dynamically adjusted, and the peak-peak value of the first output voltage Vo1 is not zero with the varying load current IL. For example, the peak-peak value $\Delta$Vo1 of the first output voltage Vo1 is adjusted to a constant value with the varying load current IL. Alternatively, if the determining condition is satisfied, the peak-peak value $\Delta$Vo1 of the first output voltage Vo1 is linearly changed with the varying load current IL.

From the above descriptions, the present disclosure provides the electromagnetic interference suppression method. If the input voltage received by the first conversion circuit of at least one power supply is a DC voltage, the at least one power supply performs an electromagnetic interference suppression operation. If the determining condition is satisfied, the first output voltage is dynamically adjusted, and the peak-peak value of the first output voltage is not zero with the varying load current. If the determining condition is not satisfied, the first output voltage adjusted to a constant voltage.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electromagnetic interference (EMI) suppression method for at least one power supply, each of the at least one power supply comprising a first conversion circuit and a second conversion circuit, the first conversion circuit receiving an input voltage and outputting a first output voltage and an output current, the second conversion circuit being controlled in a frequency modulation manner, the second conversion circuit receiving the first output voltage and the output current and outputting a load current and a second output voltage, the electromagnetic interference suppression method comprising steps of:
   when the input voltage received by the first conversion circuit of the at least one power supply is a DC voltage, performing an electromagnetic interference suppression operation; and
   performing the electromagnetic interference suppression operation to determine whether the load current is greater than a preset current and lower than an upper current limit, wherein when the load current is lower than the preset current or greater than the upper current limit, the first output voltage is adjusted to a constant voltage, wherein when the load current is greater than the preset current and lower than the upper current limit, the first output voltage is dynamically adjusted, and a peak-peak value of the first output voltage is not zero with the varying load current.

2. The EMI suppression method according to claim 1, wherein when the load current is greater than the preset current and lower than the upper current limit, the peak-peak value of the first output voltage is adjusted to a constant value with the varying load current.

3. The EMI suppression method according to claim 1, wherein when the load current is greater than the preset current and lower than the upper current limit, the peak-peak value of the first output voltage is linearly changed with the varying load current.

4. The EMI suppression method according to claim 1, wherein each of the at least one power supply further comprises a first controller and a second controller, wherein the first conversion circuit is controlled by the first controller, the second conversion circuit is controlled by the second controller, and the first controller and the second controller are in communication with each other.

5. The EMI suppression method according to claim 4, wherein the second controller detects a magnitude of the load current, and a detecting result about the magnitude of the load current is provided to the first controller, wherein the first output voltage from the first conversion circuit is controlled by the first controller according to the detecting result.

6. The EMI suppression method according to claim 1, wherein when the first output voltage is dynamically adjusted and the peak-peak value of the first output voltage is linearly changed with the varying load current, the peak-peak value of the first output voltage is equal to a difference between the load current and the preset current multiplied by a fixed value.

7. The EMI suppression method according to claim 1, wherein the first conversion circuit s a boost conversion circuit or a buck conversion circuit, and the second conversion circuit is a resonant conversion circuit.

8. The EMI suppression method according to claim 1, wherein the at least one power supply comprises a plurality of power supplies in parallel connection, and the first conversion circuits of the plurality of power supplies provide a plurality of first output voltages, respectively, wherein input terminals of the plurality of power supplies are electrically connected with each other, output terminals of the plurality of power supplies are electrically connected with each other, and there is a phase difference between the first output voltages from the first conversion circuits of every two adjacent power supplies.

9. The EMI suppression method according to claim 8, wherein the at least one power supply comprises N power supplies, and first conversion circuits of the N power supplies provide N first output voltages, respectively, wherein the phase difference between the first output voltages from the first conversion circuits of every two adjacent power supplies is 360°/N.

10. An electromagnetic interference (EMI) suppression method for at least one power supply, each of the at least one power supply comprising a first conversion circuit and a second conversion circuit, the first conversion circuit receiving an input voltage and outputting a first output voltage and an output current, the second conversion circuit being controlled in a frequency modulation manner, the second conversion circuit receiving the first output voltage and the output current and outputting a load current and a second output voltage, the electromagnetic interference suppression method comprising steps of:

when the input voltage received by the first conversion circuit of the at least one power supply is a DC voltage, performing an electromagnetic interference suppression operation; and performing the electromagnetic interference suppression operation to determine whether the load current is greater than a preset current and lower than an upper current limit, wherein when the load current is greater than the preset current and lower than the upper current limit, the first output voltage is dynamically adjusted, and a peak-peak value of the first output voltage is not zero with the varying load current.

11. The EMI suppression method according to claim 10, wherein when the load current is greater than the preset current and lower than the upper current limit, the peak-peak value of the first output voltage is adjusted to a constant value with the varying load current.

12. The EMI suppression method according to claim 10, wherein when the load current is greater than the preset current and lower than the upper current limit, the peak-peak value of the first output voltage is linearly changed with the varying load current.

13. The EMI suppression method according to claim 10, wherein when the load current is lower than the preset current or greater than the upper current limit, the first output voltage is adjusted to a constant voltage.

14. The EMI suppression method according to claim 10, wherein each of the at least one power supply further comprises a first controller and a second controller, wherein the first conversion circuit is controlled by the first controller, the second conversion circuit is controlled by the second controller, and the first controller and the second controller are in communication with each other.

15. The EMI suppression method according to claim 14, wherein the second controller detects a magnitude of the load current, and a detecting result about the magnitude of the load current is provided to the first controller, wherein the first output voltage from the first conversion circuit is controlled by the first controller according to the detecting result.

16. The EMI suppression method according to claim 10, wherein when the first output voltage is dynamically adjusted and the peak-peak value of the first output voltage is linearly changed with the varying load current, the peak-peak value of the first output voltage is equal to a difference between the load current and the preset current multiplied by a fixed value.

17. The EMI suppression method according to claim 10, wherein the first conversion circuit is a boost conversion circuit or a buck conversion circuit, and the second conversion circuit is a resonant conversion circuit.

18. The EMI suppression method according to claim 10, wherein the at least one power supply comprises a plurality of power supplies in parallel connection, and the first conversion circuits of the plurality of power supplies provide a plurality of first output voltages, respectively, wherein input terminals of the plurality of power supplies are electrically connected with each other, output terminals of the plurality of power supplies are electrically connected with each other, and there is a phase difference between the first output voltages from the first conversion circuits of every two adjacent power supplies.

19. The EMI suppression method according to claim 18, wherein the at least one power supply comprises N power supplies, and first conversion circuits of the N power supplies provide N first output voltages, respectively, wherein the phase difference between the first output voltages from the first conversion circuits of every two adjacent power supplies is 360°/N.

* * * * *